(12) United States Patent
Imaizumi

(10) Patent No.: US 6,906,984 B2
(45) Date of Patent: Jun. 14, 2005

(54) OPTICAL HEAD DEVICE

(75) Inventor: Yasukazu Imaizumi, Ashikaga (JP)

(73) Assignee: Sanyo Electric Co., Ltd., Osaka (JP)

( * ) Notice: Subject to any disclaimer, the term of this patent is extended or adjusted under 35 U.S.C. 154(b) by 346 days.

(21) Appl. No.: 10/356,165

(22) Filed: Jan. 30, 2003

(65) Prior Publication Data

US 2003/0202434 A1 Oct. 30, 2003

(30) Foreign Application Priority Data

Apr. 26, 2002 (JP) ........................................ 2002-126048

(51) Int. Cl.$^7$ ............................................... G11B 7/00
(52) U.S. Cl. .................................................. 369/44.15
(58) Field of Search .......................... 369/44.15, 44.16, 369/44.14; 359/811, 813, 814, 819, 822, 823, 824

(56) References Cited

U.S. PATENT DOCUMENTS 5,850,313 A * 12/1998 Miyagi et al. ............... 359/813
6,377,521 B1 * 4/2002 Kijima et al. ............ 369/44.23

FOREIGN PATENT DOCUMENTS

JP        2000-048374        2/2000

* cited by examiner

Primary Examiner—Paul W. Huber
(74) Attorney, Agent, or Firm—Hogan & Hartson, LLP

(57) ABSTRACT

In an optical head device in which a lens holder (3) for mounting an objective lens (2) therein is formed integral with a housing (1) via a connecting part (5), a coil holder (6) having driving coils wound thereon is mounted, a movable part of an actuator is assembled by combining the lens holder (3) with the coil holder (6), an elastic support member (11) elastically supporting the movable part of the actuator on the housing (1) is strung to a support member (12) formed integral with the housing (1) and also strung to mounting parts (3a, 3b) formed integral with the lens holder (3), and, as the movable part of the actuator is supported on the housing (1) by the elastic support member (11), the lens holder (3) is detached from the housing (1) by removing a connecting part (5).

4 Claims, 3 Drawing Sheets

OPTICAL HEAD DEVICE

BACKGROUND OF THE INVENTION

1. Field of the Invention

The present invention relates to an optical head device having a structure such that an actuator is mounted in a housing, and more particularly to an optical head device featuring improved accuracy of the positioning of the movable component of the actuator during assembly work.

2. Description of the Prior Art

Optical head devices for optically reading or writing signals to or from a disk have hitherto been structured such that an actuator for driving an objective lens is mounted in a housing, which incorporates a semiconductor laser as a light-emitting element and a photodetector as a light-receiving element. In the housing, there are formed an optical path for guiding a laser beam emitted from the semiconductor laser to the objective lens and another optical path for guiding the laser beam back to the objective lens after it is reflected by the disk.

When mounting the actuator to the housing, it has been necessary to perform skew adjustment of the actuator in both tangential and radial directions of the disk in order to adjust the optical axis of a laser beam incident on the disk so as to suppress coma aberration of the light spot focused on the disk.

In an optical head device such as this, as shown in Japanese Patent Laid-Open Publication No. 2000-48374, for example, the actuator is made capable of skew adjustment by designing it to be mounted to the housing in a manner to permit skew adjustment in both tangential and radial directions of the disk.

However, to perform the skew adjustment described above, it is necessary to carry out a manufacturing process using a special-purpose assembly jig and a complicated inspection process. This negatively effects production efficiency of the optical head devices and impedes attempts at cost reduction.

The structure of an optical head device formed capable of skew adjustment is itself an obstacle to decreasing the number of parts, and a problem remains that skew adjustment tends to slip back to some extent due to environmental changes, such as temperature and humidity.

Another problem with conventional art is that support positions of the ends the suspension wires, in other words, the actuator movable part side and the opposite housing side of each suspension wire, tend to vary, such that imbalance arises among the positions at which the suspension wires are strung. As a result, the position of the objective lens changes when the objective lens is shifted for tracking or focusing and optical performance is impaired.

SUMMARY OF THE INVENTION

The present invention provides an optical head device in a structure such that an actuator for driving an objective lens is mounted in a housing having a light emitting element and a light receiving element incorporated therein, wherein a lens holder for mounting the objective lens therein is formed integral with the housing with interposition of a connecting part, wherein a coil holder having driving coils wound thereon is separate from the lens holder and is combined with the lens holder, wherein a movable component of the actuator is assembled by combining the lens holder with the coil holder, wherein an elastic support member elastically supporting the movable component of the actuator is strung to a support member formed integral with the housing and also strung to mounting parts formed integral with the lens holder under a condition that the movable component of the actuator is supported on the housing by the elastic support member, and wherein the lens holder is detachable from the housing by trimming of the connecting part.

With a configuration as described providing improved dimensional accuracy of the lens holder with respect to the housing, the lens holder is arranged at a position with respect to the housing with a level accuracy such that skew adjustment is not necessary, and under the condition that the lens holder position is prevented from being displaced, the movable component of the actuator is assembled by combining the lens holder with the coil holder, and under the condition that the elastic support member has been strung to the support member formed integral with the housing and also on the mounting parts formed integral with the lens holder, the movable component of the actuator is set in a correct position to the housing when the lens holder is detached from the housing.

DESCRIPTION OF THE PREFERRED EMBODIMENT

Figure 1:
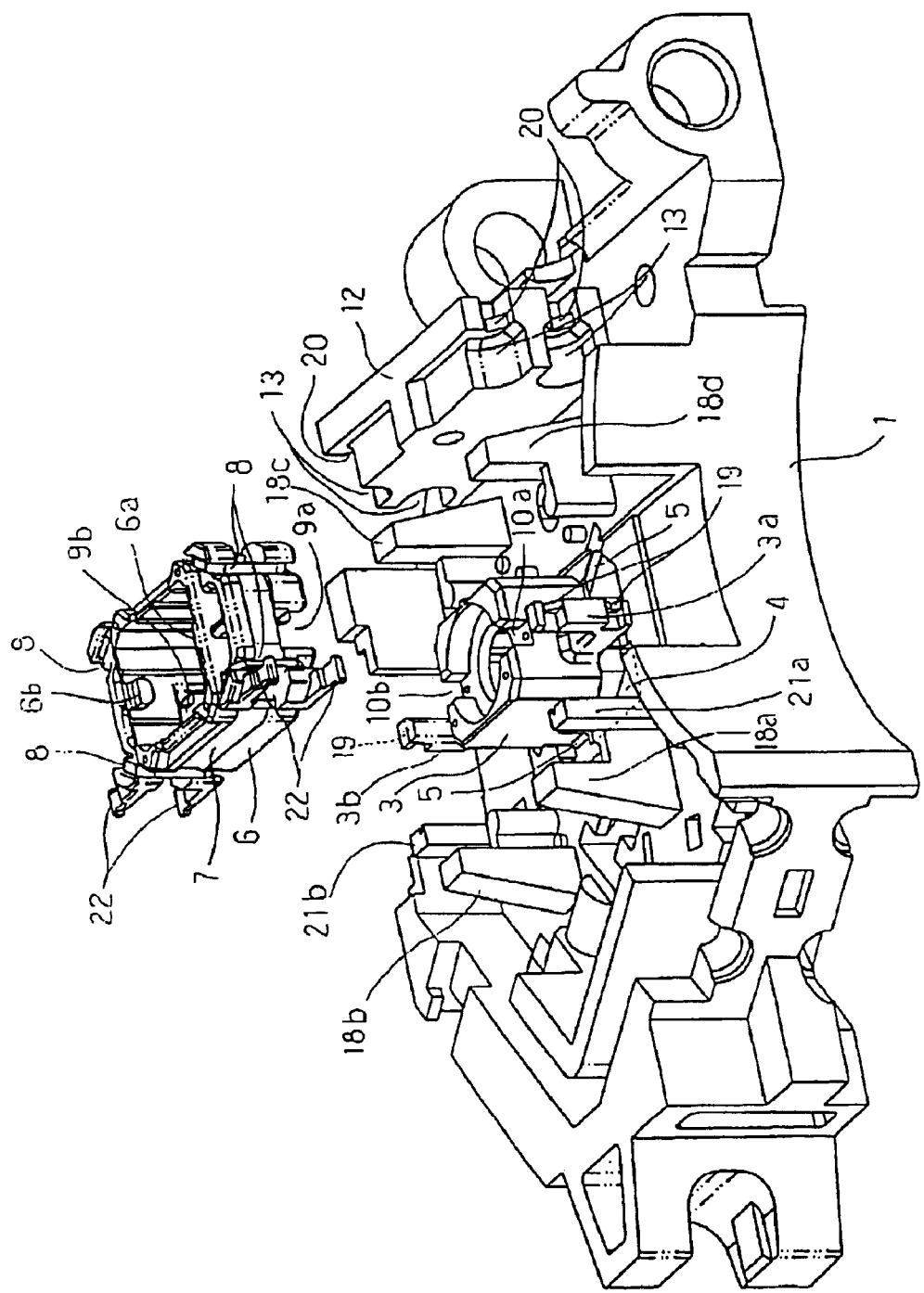
FIG. 1 is an extended perspective view showing a principal portion of an optical head device according to an embodiment of the present invention.
Figure 2:
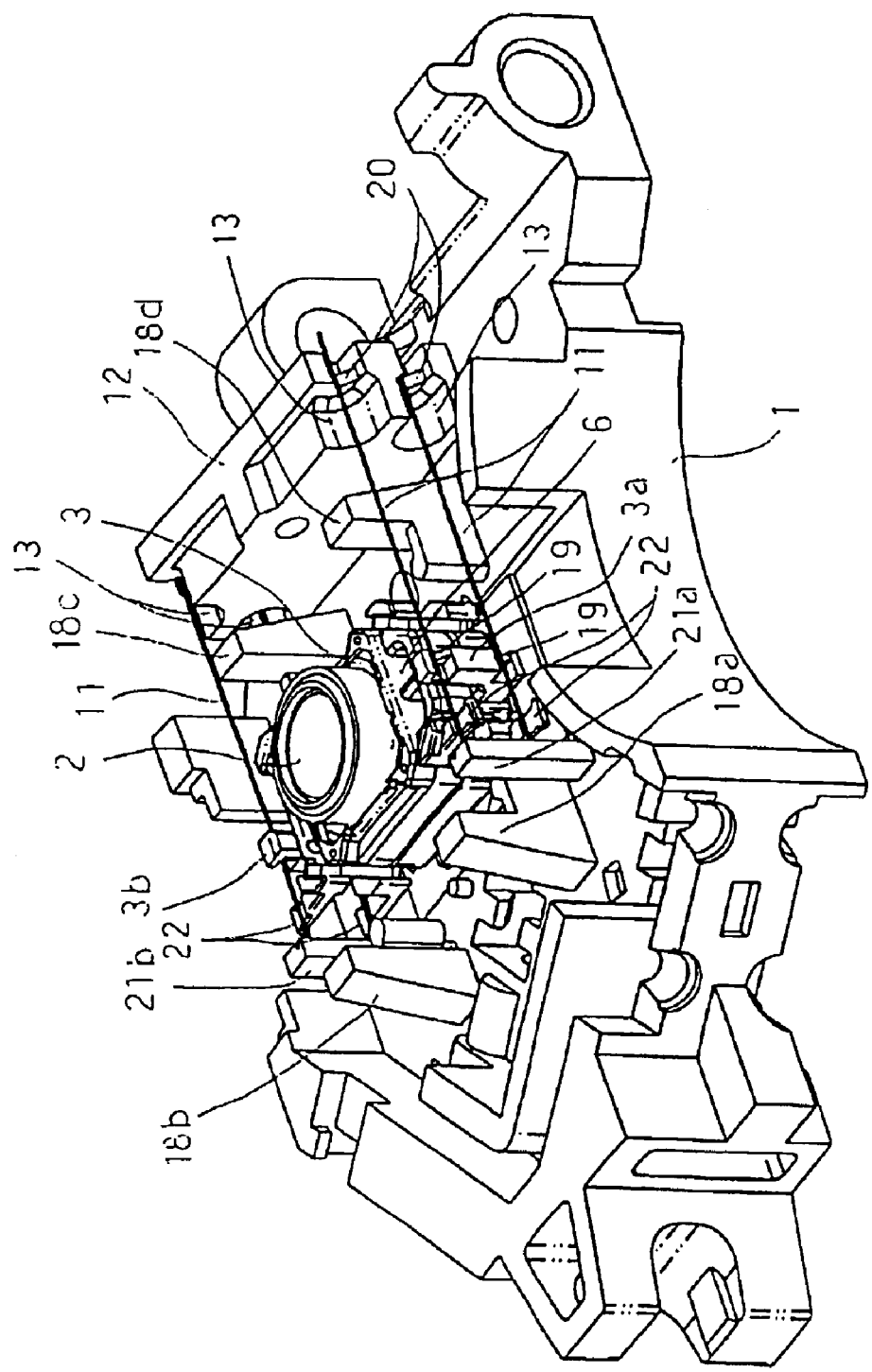
FIG. 2 is a perspective view showing a half-assembled state of a movable actuator component of the optical head device in FIG. 1.
Figure 3:
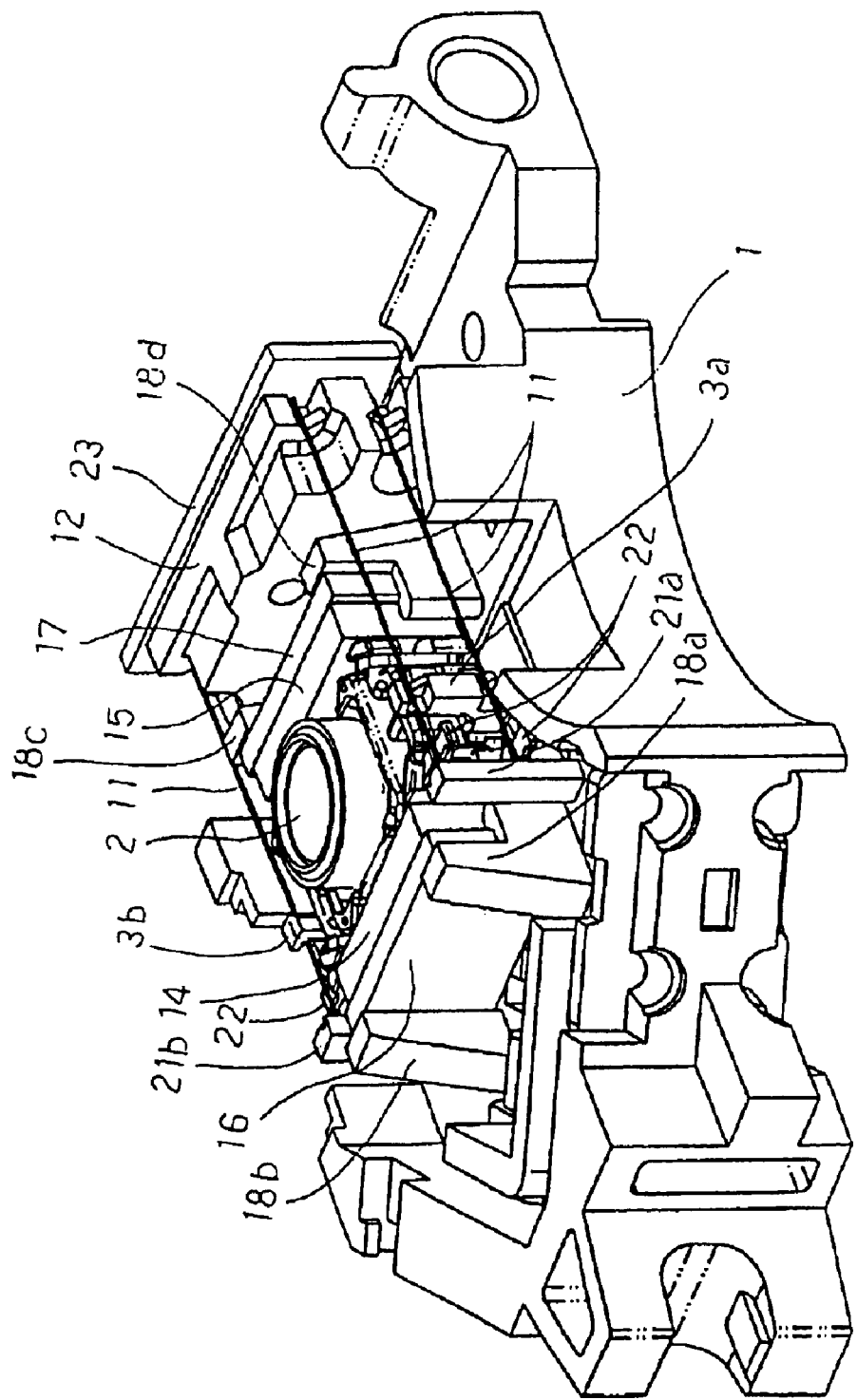
FIG. 3 is a perspective view showing the assembled state of the movable actuator component of the optical head device in FIG. 1.

FIG. 1 is an extended perspective view showing a principal portion of an optical head device according to an embodiment of the present invention. FIG. 2 is a perspective view showing a half-assembled state of a movable component of the actuator in the optical head device in FIG. 1. FIG. 3 is a perspective view showing the movable actuator component in a fully assembled state.

The housing 1 made of synthetic resin incorporates a semiconductor laser (not shown) as a light-emitting element and a photodetector (not shown) as a light-receiving element. In the housing 1, there are formed an optical path for guiding a laser beam emitted from the semiconductor laser to an objective lens 2 and another optical path for guiding the laser beam back to the objective lens after it is reflected by the disk.

A lens holder 3 has the objective lens 2 mounted therein, and the lens holder 3 is formed above an empty space 4 in the housing, which serves as the optical path of the laser beam, and the lens holder 3 is formed integral with the housing 1 via a plurality of connecting parts 5.

The lens holder 3 is formed integral with L-angled mounting parts 3a, 3b at lower positions thereof and in a symmetrical relationship thereto.

To a coil holder 6 are fitted driving coils, such as a focusing coil 7 and tracking coils 8. The coil holder 6 is bonded firmly to the lens holder 3 by an adhesive in such a manner as to encircle the lens holder 3. With this configuration, because the mounting parts 3a, 3b are fitted into the slots 9a, 9b of the coil holder 6 and projections 6a, 6b of the coil holder 6 are fitted into the slots 10a, 10b of the lens holder 3, the coil holder 6 is easily set in a specified position of the lens holder.

Four suspension wires 11 are strung to one side to the support member 12 as an integral part of the housing and on the other side to the mounting parts 3a, 3b of the lens holder 3. The four suspension wires elastically support the actuator's movable component comprising the lens holder 3 and the coil holder 6. In the support member 12, empty spaces 13 are formed which are filled with a damping material to restrict the movement of the suspension wires 11.

Permanent magnets 14, 15 are arranged with their same magnetic-pole surfaces facing each other across the movable component of the actuator to apply an effective magnetic field to the effective sides of the focusing coil, and yokes 16, 17 are attached to the outer magnetic pole surfaces of the permanent magnets 14, 15. The permanent magnets 14, 15 and the yokes 16, 17 are set in tight contact with the vertical protrusions 18a, 18b, 18c and 18d formed integral with the housing 1, so that they are arranged in specified positions of the housing 1.

Description will now be made of a method for assembling an optical head device comprising the component parts described above.

The driving coils, i.e., the focusing coil 7 and the tracking coils 8, are wound around the coil holder 6 using an automated device. By joining the coil holder 6 with the lens holder 3 using adhesive bonding, the driving coils—the focusing coil 7 and the tracking coils 8—are mounted indirectly to the lens holder 3.

When the coil holder 6 is combined with the lens holder 3, the mounting parts 3a, 3b are inserted into the slots 9a, 9b of the coil holder 6 and the projections 6a, 6b of the coil holder are inserted into the slots 10a, 10b of the lens holder 3, thereby ensuring proper positioning of the coil holder 6.

Then, the four suspension wires 11 are strung through the support member 12 and the mounting parts 3a, 3b of the lens holder 3.

When stringing the suspension wires 11, the left or the right side of the movable component of the actuator, to which the suspension wires 11 are to be bonded firmly, is turned up and two, upper and lower, suspension wires 11 are inserted into the slots of the mounting parts 3a, 3b and into the slots in the support member 12 from above, namely, two wires on each side. For each insertion of two wires, an adhesive is inserted into the slots of the mounting parts 3a, 3b and into the slots of the support member 12, and then the wires are bonded.

Here, it may be noted that when the left or the right side of the movable component of the actuator is turned up, the support surfaces 19, 20, which support the suspension wires 11, in the slots of the mounting parts 3a, 3b and in the slots of the support member 12 are in the shape of the letter V pointed in the direction of the weight of the suspension wires 11 supported thereon.

In the manner as described, the suspension wires 11 are bonded by adhesive bonding under the condition that they are supported on one side by the V-shaped support surfaces 19 on the internal walls of the mounting parts 3a, 3b and on the other side by the V-shaped support surfaces 20 on the internal walls of the slots of the support member 12.

In a case as described, the suspension wires 11 are circular cross-sectioned and the support surfaces 19 of the mounting parts 3a, 3b and the support surfaces 20 of the support member 12 are in the shape of the letter V pointed in the direction of the weight of the suspension wires 11 supported thereon. Therefore, each of the suspension wires 11 is positioned both at one side and at the other side thereof under the condition that the wire is in contact with the two faces of the V-shaped support surfaces 19, 20 without stress generation, with the result that the strung position of each suspension wire 11 can be set simply and with a very high accuracy.

Because they are formed integral with the lens holder 3, the mounting parts 3a, 3b will not be affected by any displacement of the coil holder 6 relative to the lens holder 3, as may occur when the coil holder 6 is combined with the lens holder 3. Therefore, for each suspension wire, the strung position of one end of it is set with high accuracy without being affected by the mounted position of the coil holder 6 relative to the lens holder 3.

Further, one end of each suspension wire 11 is positioned in axial direction by columnar protrusions 21a, 21b formed integral with the housing 1.

After each suspension wire 11 has been strung, one tip of the wire 11 is soldered to the lugs 22 around which the leading ends of the driving coils of the lens holder 3 are twisted, and the other tip of the wire 11 is soldered to a wiring board 23 that is screwed to the support member 12. Thus, drive-signal supply paths for driving coils are formed by stringing the suspension wires 11.

Because the suspension wires 11 are arranged in the empty spaces 13 of the support member 12, their movement can be restricted by filling the empty spaces with a damping material.

After the suspension wires 11 have been strung, yokes 16, 17, to which the permanent magnets 14, 15 are to be firmly attached, are mounted on the housing 1 such that they are in tight contact with the vertical projections 18a, 18b, 18c and 18d, by which the yokes are accurately positioned.

An objective lens 2 is fixed by adhesive bonding to the lens holder 3 combined with the coil holder 6. Here, the objective lens 2 is positioned by a recessed portion in the lens holder 3 and set in the lens holder 3 in a correct position without inclination.

After the actuator has been assembled as described, the lens holder 3 is detached from the housing 1 by snapping off and removing the connecting parts 5. As a result, the movable component of the actuator is elastically supported on the housing 1 so as to be displaceable to perform focus control to focus a light beam on the signal surface of the disk and also to perform tracking control to cause the light beam to follow a signal track on the disk.

The suspension wires 11 are so arranged as to limit stress when the lens holder 3 is detached from the housing 1. Therefore, when the lens holder 3 is detached from the housing 1, the movable part of the actuator sags by its own weight but, with the present configuration, is prevented from being displaced to such an extent that the optical axis of the objective lens 2 requires skew adjustment in tangential or radial directions of the disk.

Before the actuator is detached from the housing 1, the lens holder 3 is arranged in its proper position relative to the housing 1 such that the optical axis does not require skew adjustment in tangential or radial directions of the disk. This is possible because of the high dimensional accuracy obtainable because the lens holder 3 is formed integral with the housing 1.

It follows therefore that the movable part of the actuator is set in a correct position relative to the housing 1 with such an accuracy as not to require skew adjustment when moveable component of the actuator is fully assembled.

After the suspension wires have been strung, the columnar protrusions 21a, 21b are removed by snapping them off, as a result of which the end portions of the suspension wires 11 are freed from regulation by the columnar protrusions 21a, 21b, with the further result that, when the optical head is in operation, the columnar protrusions 21a, 21b do not adversely affect the displacement of the suspension wires 11.

As has been described, according to the present invention, with the improved dimensional accuracy obtainable because the lens holder is integrally formed with the housing, the lens holder is accurately positioned on the housing so that the holder need not be subjected to skew adjustment, and, after the movable component of the actuator has been assembled, the lens holder is detached from the housing. This arrangement are advantageous for accurately mounting the movable part of the actuator at a desired position on the housing. Further, because the mounting parts are integrally formed with the lens holder and the strung position of one end of each suspension wire is independent of any displacement of the coil holder with respect to the lens holder, as occurs when the coil holder is combined with the lens holder. Therefore, it is possible to provide an optical head device which enables accurate setting of the strung position of one end of each suspension wire, without being affected by the mounted position of the coil holder relative to the lens holder.

Further, because the coil holder is provided as a component separate from the lens holder, while the lens holder is formed integral with the housing, it is possible to employ automatic winding of the driving wires using an automated device for winding coils, and to attach driving coils to the lens holder.

According to the present invention, because the suspension wires are positioned with ends contacting two surfaces of the V-shaped support surfaces, the suspension wires can be easily positioned with a high accuracy.

Further, another advantage of the present invention is that, when the lens holder and the support member are formed integral with the housing and the support member has formed therein spaces that are filled with a damping material, the number of parts can be reduced and an elastic support material can be arranged in desired positions where the damping material is applied, without any adjusting of the position of the support member.

What is claimed is:

1. An optical head device in a structure in which an actuator for driving an objective lens is mounted in a housing having a light emitting element and a light receiving element incorporated therein, wherein a lens holder for mounting said objective lens therein is formed integral with said housing with interposition of a connecting part, a coil holder having driving coils wound thereon is a separate component from said lens holder and is combined with said lens holder, a movable part of the actuator is assembled by combining said lens holder with said coil holder, an elastic support member elastically supporting said movable part of said actuator is strung to a support member formed integral with said housing and to mounting parts formed integral with said lens holder, and while said movable part of the actuator is supported on said housing by said elastic support member, said lens holder is detached from said housing by removal of said connecting part.

2. An optical head device according to claim 1, wherein said elastic support member is a suspension wire and wherein said support member and said mounting parts have formed thereon V-shaped support surfaces for supporting said suspension wire.

3. An optical head device according to claim 1, wherein said support member has formed therein an empty space for filling a damping material to restrict a movement of said elastic support member.

4. An optical head device according to claim 2, wherein said support member has formed therein an empty space for filling a damping material to restrict a movement of said elastic support member.

* * * * *